United States Patent [19]

Isshiki et al.

[11] Patent Number: 5,568,732
[45] Date of Patent: Oct. 29, 1996

[54] AIR CONDITIONING APPARATUS AND METHOD OF CONTROLLING SAME

[75] Inventors: Masao Isshiki; Yukio Kiguchi; Takashi Sato; Yasuhiro Kageyama, all of Shizuoka-ken, Japan

[73] Assignee: Kabushiki Kaisha Toshiba, Kawasaki, Japan

[21] Appl. No.: 420,776

[22] Filed: Apr. 12, 1995

[30] Foreign Application Priority Data

Apr. 12, 1994 [JP] Japan .................................. 6-073071

[51] Int. Cl.⁶ ........................................ F25B 49/02
[52] U.S. Cl. ........................ 62/129; 62/180; 62/228.4; 62/228.5
[58] Field of Search .............................. 62/180, 181, 183, 62/184, 179, 214, 215, 182, 207, 213, 203, 208, 209, 226, 228.1, 229, 228.4, 228.5, 126, 129; 374/141, 147; 364/557

[56] References Cited

U.S. PATENT DOCUMENTS 4,910,966  3/1990  Levine et al. ............................ 62/129
5,408,837  4/1995  Omura ................................ 62/180 X

FOREIGN PATENT DOCUMENTS 62-125244  6/1987  Japan .

*Primary Examiner*—Harry B. Tanner
*Attorney, Agent, or Firm*—Cushman, Darby & Cushman

[57] ABSTRACT

An air conditioning apparatus and method of controlling same wherein the air conditioner includes a refrigerating circuit having a variable capacity compressor, an indoor heat exchanger, an expansion device, and an outdoor heat exchanger; a variable speed outdoor fan for circulating an outside air through the outdoor heat exchanger; and an outdoor heat exchanger temperature detector for detecting the temperature of the outdoor heat exchanger. The outside air temperature is estimated from the detected outdoor heat exchanger temperature, the capacity of the variable capacity compressor and the speed of the variable speed outdoor fan, and is used to control the compressor and/or the fan.

24 Claims, 10 Drawing Sheets

Fig. 4

MODE: COOLING
FAN SPEED: "H" or "M"

CORRECTION VALUE (Cv)

| Te (°C) \ F (Hz) | F < 15 | 15 ≤ F < 20 | 20 ≤ F < 27 | 27 ≤ F < 40 | 40 ≤ F < 60 | 60 ≤ F |
|---|---|---|---|---|---|---|
| Te < 24.5 | −3 | −5 | −5.5 | −5.5 | −5 | −5 |
| 24.5 ≤ Te < 34.5 | −3 | −4.5 | −5.5 | −6 | −6 | −5.5 |
| 34.5 ≤ Te < 45.0 | −3 | −4.5 | −5.5 | −6 | −6 | −5.5 |
| 45.0 ≤ Te | −3 | −4 | −5.5 | −7 | −7.5 | −7 |

Fig. 5

MODE: COOLING
FAN SPEED: "L"

CORRECTION VALUE (Cv)

| F (Hz) / Te (°C) | F < 15 | 15 ≤ F < 20 | 20 ≤ F < 27 | 27 ≤ F < 40 | 40 ≤ F < 60 | 60 ≤ F |
|---|---|---|---|---|---|---|
| Te < 24.5 | −3 | −5 | −6 | −6.5 | −6.5 | −7 |
| 24.5 ≤ Te < 34.5 | −3 | −5 | −6 | −7 | −7 | −7 |
| 34.5 ≤ Te < 45.0 | −3 | −5 | −6 | −7 | −7 | −7 |
| 45.0 ≤ Te | −3 | −4.5 | −6.5 | −7 | −8 | −8 |

*Fig. 6*

MODE: HEATING
FAN SPEED: "M" or "L"

CORRECTION VALUE (Cv)

| Te (°C) \ F (Hz) | F < 15 | 15 ≤ F < 20 | 20 ≤ F < 27 | 27 ≤ F < 40 | 40 ≤ F < 60 | 60 ≤ F |
|---|---|---|---|---|---|---|
| Te < 24.5 | 2 | 2.5 | 4 | 4 | 5.5 | 5.5 |
| 24.5 ≤ Te < 34.5 | 1 | 2.5 | 3 | 5 | 6.5 | 6.5 |
| 34.5 ≤ Te < 45.0 | 1 | 2.5 | 3 | 5 | 6.5 | 6.5 |
| 45.0 ≤ Te | 2 | 3 | 4 | 6 | 7.5 | 7.5 |

Fig. 7

MODE: HEATING
FAN SPEED: "H"

CORRECTION VALUE (Cv)

| Te (°C) \ F (Hz) | F < 15 | 15 ≤ F < 20 | 20 ≤ F < 27 | 27 ≤ F < 40 | 40 ≤ F < 60 | 60 ≤ F |
|---|---|---|---|---|---|---|
| Te < 24.5 | 1 | 1.5 | 3 | 3 | 4.5 | 4.5 |
| 24.5 ≤ Te < 34.5 | 0 | 1.5 | 2 | 4 | 5.5 | 5.5 |
| 34.5 ≤ Te < 45.0 | 0 | 1.5 | 2 | 4 | 5.5 | 5.5 |
| 45.0 ≤ Te | 1 | 2.5 | 3 | 5 | 6.5 | 6.5 |

AIR CONDITIONING APPARATUS AND METHOD OF CONTROLLING SAME

BACKGROUND OF THE INVENTION

1. Field of the Invention

The present invention relates to a method and apparatus for controlling an air conditioner having a refrigerating circuit, especially, control apparatus for estimating an outside temperature in order to control the air conditioner.

2. Description of Related Art

An air conditioning unit typically has a refrigeration circuit which is composed of a compressor, a four way valve, an indoor heat exchanger, an expansion device and an outdoor heat exchanger. Some air conditioners require detection of the outside air temperature. For example, the following parameters can all be controlled in accordance with the outside air temperature: the speed control of an outdoor fan which circulates air past the outdoor heat exchanger, a current release control to control the speed of the compressor, a room temperature setting change control which corrects a room temperature setting in accordance with outside temperature in order to improve the comfort in the room and so on. These air conditioners therefore require an outside temperature sensor, for example a thermistor, bimetal or thermocouple sensor, which detects the outside air temperature.

One type of air conditioner includes the refrigeration circuit in a single case. In such an air conditioner, the outside temperature sensor is attached outside of the air conditioner case. The location of the outside temperature sensor is selected so that the correct outside air temperature is detected, avoiding the influence of the air flow of the outside fan, sunlight and radiation from the outdoor heat exchanger. Furthermore, the outside temperature sensor should be kept dry from rain or snow because the sensor is an electrical device.

Another type of air conditioner has an indoor unit including an indoor heat exchanger, and a separate outdoor unit including a compressor, a four way valve, an expansion device and an outdoor heat exchanger. Refrigeration pipes connect the indoor unit and the outdoor unit to form a closed refrigeration circuit. In air conditioners with separate indoor and outdoor units, an outside temperature sensor is placed in the outdoor unit. In this case, whether or not the outside temperature sensor is subject to the influence of sunlight depends on the site of the outdoor unit. Therefore, the site to install the outdoor unit should be selected so that the outside temperature sensor accurately detects the outside air temperature. If the site of the outdoor unit is subject to strong sunlight, the outside temperature sensor will also be subject to the sunlight. The detected outside air temperature will be higher than the correct value. Thus care must be taken to determine the proper placement of the outdoor unit. However, many other factors influence placement of the outside unit.

To avoid the need for an outside temperature sensor, it is also known to estimate the outside air temperature on the basis of the temperature of the outdoor heat exchanger. The principal behind estimating the outside air temperature is that the outdoor heat exchanger temperature depends on the outside temperature. The estimate is carried out a predetermined period after the air conditioner starts. At that time, the outdoor heat exchanger temperature is detected, and the outside air temperature is estimated by correcting the detected outdoor heat exchanger temperature with a predetermined value. However, the outdoor heat exchanger temperature depends not only on the outside temperature, but also on air volume passing through the outdoor heat exchanger. Therefore, this approach does not estimate the correct outside temperature accurately.

SUMMARY OF THE INVENTION

It is an object of the invention to provide an improved control method and apparatus for an air conditioner.

It is another object of the invention to correctly estimate the outside air temperature.

It is further object of the invention to obtain a correct outside air temperature with high reliability without using an outside temperature sensor.

To achieve the above objects, the present invention provides an improved method and apparatus for controlling an air conditioner which has a refrigerating circuit including a variable capacity compressor, an indoor heat exchanger, an expansion device, and an outdoor heat exchanger and a variable speed outdoor fan for circulating outside air through the outdoor heat exchanger. The temperature of the outdoor heat exchanger is detected and the outside air temperature is estimated based not only on the detected outdoor heat exchanger temperature, but also on the capacity of the variable capacity compressor and the speed of the variable speed outdoor fan.

Throughout this application, including the claims, the terms "air conditioning" and "air conditioner" refer to an apparatus or method that can perform only heating, only cooling, or heating or cooling selectively.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which:

FIG. 4 is a table showing correction values, which are used for outside air temperature estimation, related to the frequency of an inverter driving a compressor and an outdoor heat exchanger temperature during high or medium outdoor fan speeds in a cooling mode;

FIG. 5 is a table showing correction values, which are used for outside temperature estimation, related to the frequency of the inverter driving the compressor and the outdoor heat exchanger temperature during a low outdoor fan speed in the cooling mode;

FIG. 6 is a table showing correction values, which are used for outside temperature estimation, related to the frequency of the inverter driving the compressor and the outdoor heat exchanger temperature during medium or low outdoor fan speeds in a heating mode;

FIG. 7 is a table showing correction values, which are used for outside temperature estimation, related to the frequency of the inverter driving the compressor and the outdoor heat exchanger temperature during a high outdoor fan speed in the heating mode;

FIG. 9 is a graph showing the relationship among the outdoor heat exchanger temperature Te, an estimated outside air temperature To2 and an actual outside temperature To;

FIG. 10 is a graph showing the relationship between a stored outside air temperature To1 and the actual outside temperature To.

DETAILED DESCRIPTION OF THE PRESENTLY PREFERRED EXEMPLARY EMBODIMENTS

An embodiment of the present invention will be explained with reference to the accompanying drawings.

Figure 1:
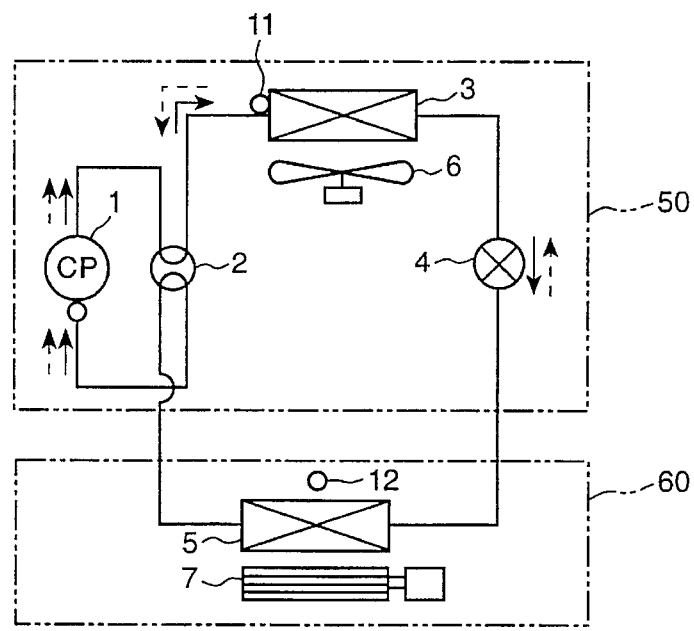
FIG. 1 is a block diagram of a refrigerating circuit of an air conditioner.

An air conditioner of this embodiment has an outdoor unit 50 mounted outside of a house and an indoor unit 60 installed in the house as shown in FIG. 1. Outdoor unit 50 includes a compressor 1, a four way valve 2, an outdoor heat exchanger 3, an expansion valve 4 and a variable speed outdoor fan 6. Outdoor fan 6 circulates air through outdoor heat exchanger 3 in order to facilitate heat exchange between the outside air and outdoor heat exchanger 3. An indoor heat exchanger 5 and an indoor fan 7 are installed in indoor unit 60. Indoor fan 7 blows room air through indoor heat exchanger 5 for the same purpose as outdoor fan 6 and to air condition the room.

The discharge and intake ports of compressor 1 are connected to four way valve 2. Another port of four way valve 2 is connected to outdoor heat exchanger 3, while the last port is connected to indoor heat exchanger 5. Expansion valve 4 is provided between indoor heat exchanger 5 and outdoor heat exchanger 3. Thus, a refrigerating circuit is composed of compressor 1, four way valve 2, outdoor heat exchanger 3, expansion valve 4 and indoor heat exchanger 5 in the air conditioner.

The air conditioner can work in a heating mode to heat the room and a cooling mode to cool the room. In the cooling mode, four way valve 2 is set in the position shown in FIG. 1. Therefore, refrigerant in the refrigerating circuit flows in the direction of the solid arrows shown in FIG. 1. In the heating mode, four way valve 2 is set in a position such that refrigerant flows in the direction of the dotted arrows shown in FIG. 1. In the cooling mode, the heated, compressed refrigerant from compressor 1 flows to outdoor heat exchanger 3. The refrigerant is cooled and condensed at outdoor heat exchanger 3 as a result of the air flow from outdoor fan 6. Then, the refrigerant is decompressed at expansion valve 4 so that it becomes a low temperature liquid. The liquid refrigerant evaporates and cools indoor heat exchanger 5. Air cooled by indoor heat exchanger 5 flows into the room to decrease the room temperature.

In the heating mode, hot gaseous refrigerant from compressor 1 flows into indoor heat exchanger 5 through four way valve 2. The hot refrigerant is condensed at indoor heat exchanger 5. The air heated by indoor heat exchanger 5 flows into the room. Then the pressure of the condensed refrigerant is reduced at expansion valve 4, and evaporates in outdoor heat exchanger 3. The refrigerant flowing from outdoor heat exchanger 3 returns to compressor 1.

An outdoor heat exchanger temperature sensor 11 is attached at outdoor heat exchanger 3 to detect the outdoor heat exchanger temperature Te. A room temperature sensor 12 is provided in a path of the intake air flow generated by indoor fan 7 to detect the room air temperature Ta.

Figure 2:
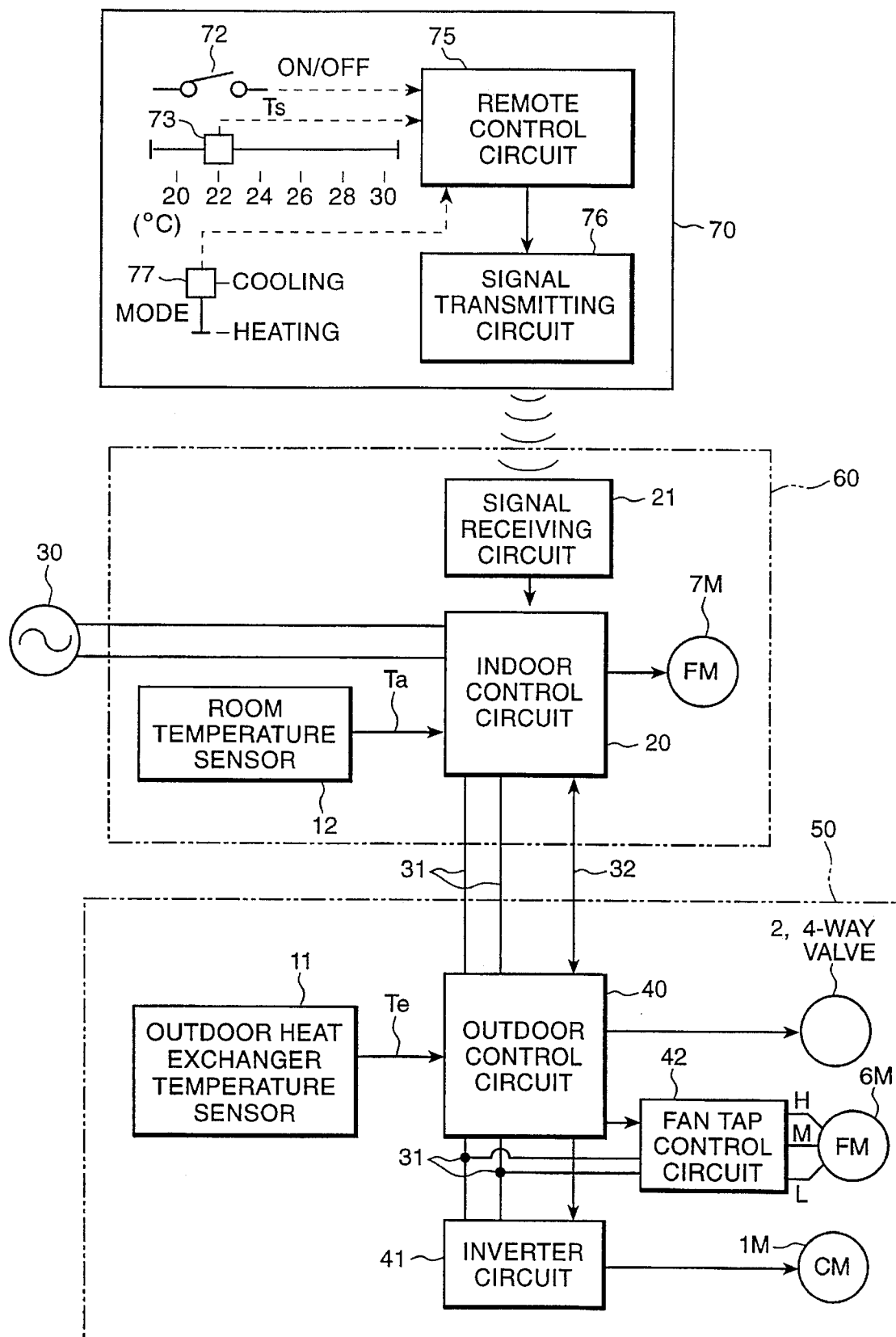
FIG. 2 is a block diagram of a control circuit of the air conditioner according to the present invention.

A control circuit of the air conditioner is shown in FIG. 2. An indoor control circuit 20 of indoor unit 60 is connected to a commercial AC power supply 30. An outdoor control circuit 40 of outdoor unit 50 is connected to indoor control circuit 20 via power lines 31 and a serial signal line 32. Indoor control circuit 20 is composed of a microcomputer and its peripheral circuits. A signal receiving circuit 21, an indoor fan motor 7M to drive indoor fan 7 and room temperature sensor 12 are connected to indoor control circuit 20. Signal receiving circuit 21 receives an infrared signal transmitted from a remote controller 70. Remote controller 70 has an operation start/end switch 72, a room temperature setting switch 73 to designate a set temperature Ts which is a room temperature desired by the user, a mode select switch 77 to select either a cooling mode or a heating mode, a remote control circuit 75, which is also composed of a microcomputer and its peripheral circuits, and a signal transmitting circuit 76 including an infrared LED.

Outdoor control circuit 40 is also composed of a microcomputer and its peripheral circuit. Four way valve 2, outdoor heat exchanger temperature sensor 11, an inverter circuit 41 and a fan tap control circuit 42 are connected to outdoor control circuit 40. Inverter circuit 41 rectifies the voltage of power line 31, and converts the voltage to a variable frequency and voltage in response to a frequency instruction signal from outdoor control circuit 40. The output of inverter circuit 41 is supplied to a compressor motor 1M to drive compressor 1. An outdoor fan motor 6M has a high speed tap "H", a medium speed tap "M" and a low speed tap "L". Fan tap control circuit 42 selects one of the taps and connects the selected tap to power line 31 in accordance with an output from outdoor control circuit 40.

When operation start/end switch 72 is pushed when the air conditioner is off, remote control circuit 75 reads the set temperature Ts designated by room temperature setting switch 73 and the operation mode selected by mode select switch 77. Then, remote control circuit 75 converts these readings to an operation start signal including the operation mode and set temperature data, and causes signal transmitting circuit 76 to transmit the operation start signal from the infrared LED.

Signal receiving circuit 21 receives the operation start signal. Then indoor control circuit 20 starts an air conditioning operation and transmits an outdoor operation signal including mode data and an inverter frequency F for inverter circuit 41 to outdoor control circuit 40 via serial signal line 32. Indoor control circuit 20 determines inverter frequency F in accordance with the difference between set temperature Ts and detected room temperature Ta, namely $\Delta T=|Ta-Ts|$. Outdoor control circuit 40 receives the outdoor operation signal, and causes outdoor unit 50 to operate. Furthermore, in this air conditioner, outdoor control circuit 40 determines the outdoor fan speed in accordance with the frequency data included in the outdoor operation signal, the estimated outside air temperature data (described below), and a protection input, for example an air conditioner excessive input and so on. Then outdoor control circuit 40 controls fan tap control circuit 42. As a result, the outdoor fan is set to the appropriate speed. Generally, the outdoor fan speed is directly related to the output frequency of inverter 41. However, in the cooling mode, when the outside air temperature is higher than a predetermined value, the outdoor fan speed is reduced one step. For example if the inverter frequency would cause the outdoor fan speed to be "H", the speed is instead set to "M". For the heating mode, when the outside air temperature is lower than a predetermined value, the outdoor fan speed is also reduced one step. Similarly, when the current passing through inverter 41 is higher than a predetermined value, the outdoor fan speed is reduced one step.

When operation start/end switch 72 is pushed while the air conditioner is ON, remote control circuit 75 causes signal transmitting circuit 76 to output an operation end signal. Signal receiving circuit 21 receives the operation end signal. Then, indoor control circuit 20 stops and transmits the operation end signal to outdoor control circuit 40 through serial signal line 32, causing outdoor control circuit 40 to also stop. Thus, the operation of the air conditioner ends.

Figure 3:
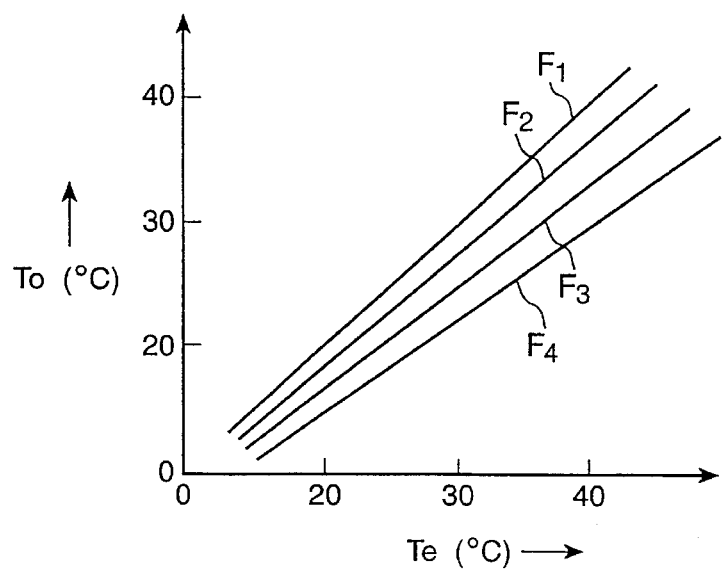
FIG. 3 is a graph showing the relationship between an outside air temperature To and an outdoor heat exchanger temperature Te.

Hereafter, estimation of the outside air temperature will be described in detail. The estimation is performed by outdoor control circuit 40 and the resulting estimated outside air temperature To2 is transferred to indoor control circuit 20 via serial signal line 32. While compressor 1 is driven, an actual outside air temperature To is directly related to outdoor heat exchanger temperature Te for various capacities of compressor 1, or output frequencies F1 to F4 (F1<F2<F3<F4) of inverter circuit 41, as shown in FIG. 3. FIG. 3 shows the relationship between an actual outside air temperature To and outdoor heat exchanger temperature Te under a fixed speed of variable speed outdoor fan 6 in the cooling mode. However, the relationship is subject to the influence of the speed of outdoor fan 6. Therefore, correction values Cv for estimating the outside air temperature are stored in a memory included in outdoor control circuit 40, based on outdoor heat exchanger temperature Te, inverter frequency F and the speed of variable speed outdoor fan 6.

Correction values Cv are stored as tables as shown in FIGS. 4 to 7. In each table, correction values Cv are based on both the outdoor heat exchanger temperature Te and inverter frequency F. The multiple tables correspond to the cooling or heating modes and the speed of outdoor fan 6. The table shown in FIG. 4 is used when the high speed tap "H" or the medium speed tap "M" is selected in the cooling mode. The table shown in FIG. 5 is used when the low speed tap "L" is selected in the cooling mode. The table shown in FIG. 6 is used when the medium speed tap "M" or the low speed tap "L" is selected in the heating mode. Finally, the table shown in FIG. 7 is used when the high speed tap "H" is selected in the heating mode. Therefore, the estimation of the outside temperature is performed by selecting tables in accordance with the operation mode and the outdoor fan speed. Then, correction value Cv is selected in accordance with outdoor heat exchanger temperature Te and inverter frequency F from the selected table. After that, estimated outside temperature To2 is determined by adding the outdoor heat exchanger temperature Te with the selected correction value Cv.

Figure 8A:
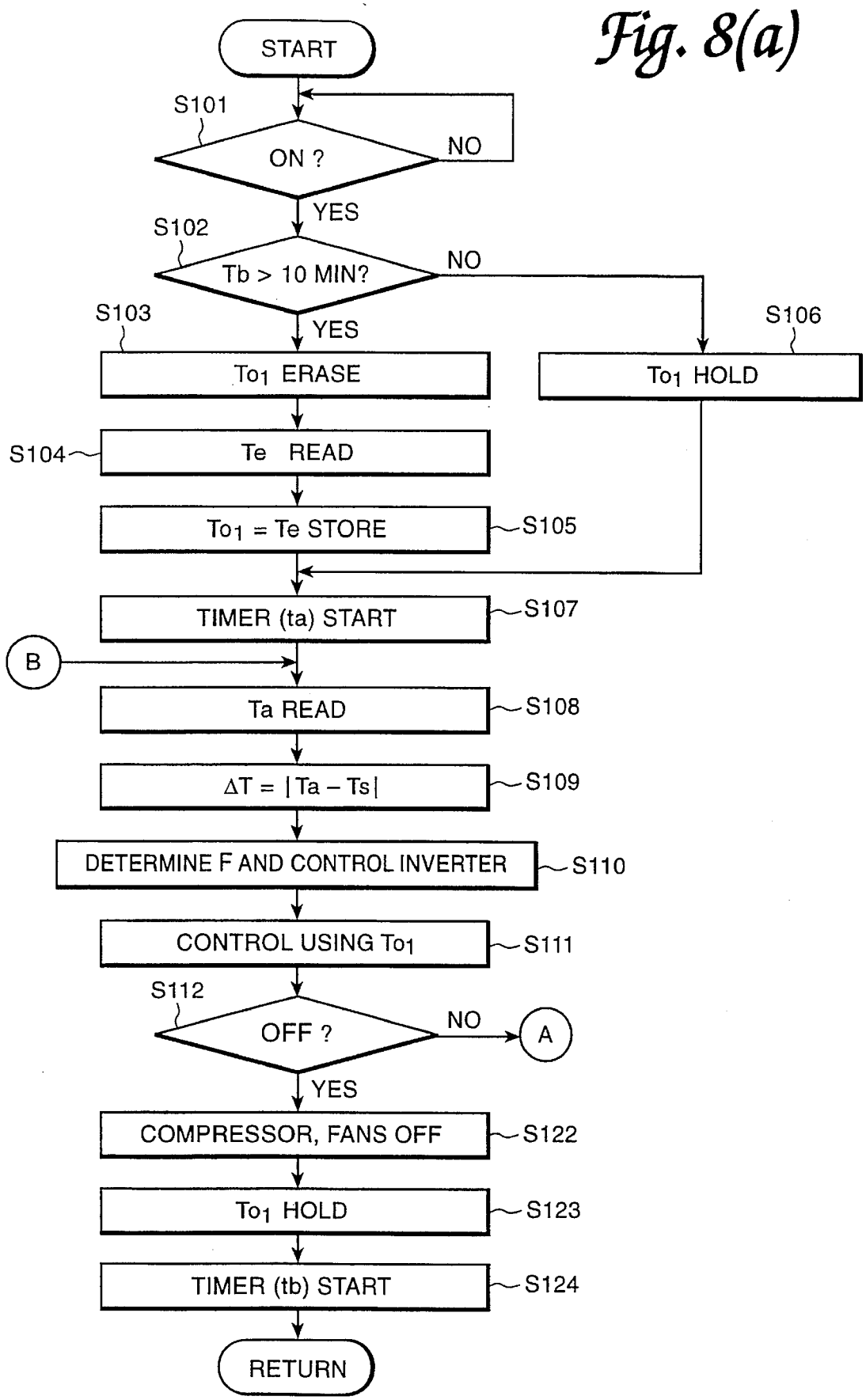
FIGS. 8(a) and 8(b) are flowcharts showing the operation of the control circuit shown in FIG. 2.
Figure 8B:
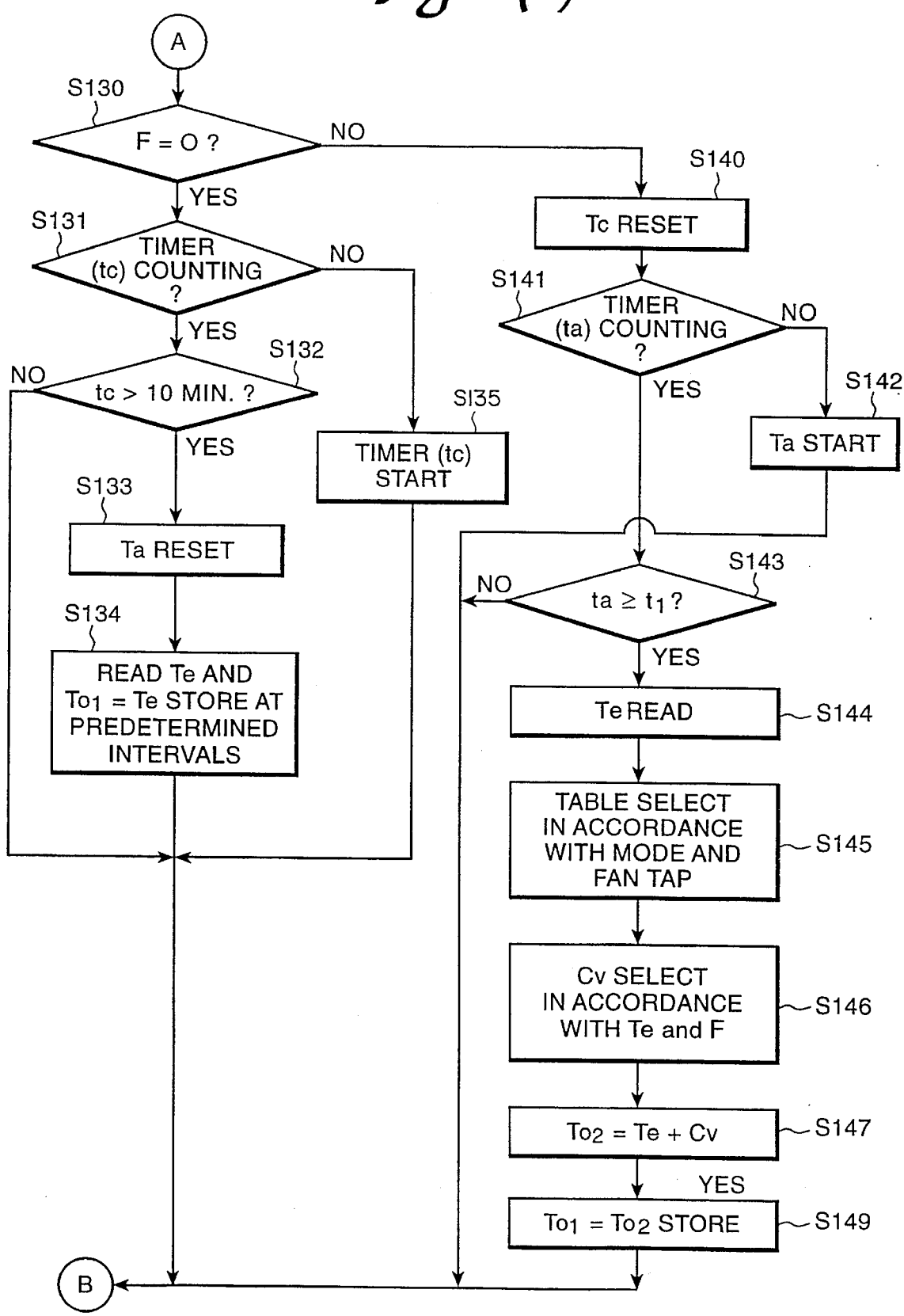

Referring now to FIGS. 8(a) and 8(b), the operation of the air conditioner and details concerning estimating the outside temperature will be explained. The flowcharts of FIGS. 8(a) and 8(b) show the overall operation flow of the air conditioner, including indoor control circuit 20 and outdoor control circuit 40.

When operation start/end switch 72 on remote controller 70 is pushed, signal transmitting circuit 76 outputs the operation start signal. The operation start signal is received by signal receiving circuit 21, and transferred to indoor control circuit 20. When indoor control circuit 20 receives the signal, an air conditioner operation starts (step S101). If indoor control circuit 20 does not receive the operation start signal, the operation flow repeats step S101. Thus, indoor control circuit 20 does not operate until the operation start signal is transferred. After the operation starts, a time Tb, which designates the time period between the end of the previous operation and the start of the current operation, is compared with 10 minutes (step S102). If the time Tb is larger than 10 minutes, previous outside air temperature To1 stored in a memory is erased (step S103), and outdoor heat exchanger temperature Te is detected (step S104) and then stored as outside air temperature To1 in the memory of the outdoor control circuit 40 (step S105). If the time Tb is not larger than 10 minutes in step 102, outside air temperature To1 stored in the memory is held (step S106).

After steps S105 and S106, a timer (ta) starts to count (step S107). Then, room temperature Ta detected by room temperature sensor 12 is read in (step S108), and the difference ΔT (|Ta–Ts|) between detected room temperature Ta and set temperature Ts designated by room temperature setting switch 73 on remote controller 70 is calculated as an air conditioning load (step S109). Next, inverter frequency F, the operation frequency of compressor 1, is calculated in accordance with the difference ΔT. Several methods can be used to calculate inverter frequency F. Examples include proportional control, proportional integral differential (PID) control, fuzzy control, and so on. Other than for the proportional control method, a time factor is needed. Therefore, except for the proportional control method, a device detects changes in room temperature Ta at predetermined intervals, for example 5 minutes. After the calculation, inverter circuit 41 supplies power with frequency F to compressor motor 1M (step S110). At the same time, the speed of variable speed outdoor fan 6M is determined.

If inverter frequency F is not 0, inverter circuit 41 starts to drive compressor motor 1M at inverter frequency F. When compressor 1 starts to rotate, refrigerant is discharged. In the cooling mode, the discharged refrigerant passes thorough four-way valve 2, indoor heat exchanger 3, expansion valve 4, outdoor heat exchanger 5 and four-way valve 2 and returns to compressor 1. In the cooling mode, outdoor heat exchanger functions as a condenser, and indoor heat exchanger functions as a evaporator. As a result, the inside of the room is cooled. In the heating mode which is selected by mode select switch 77, four-way valve 2 is switched, and discharged refrigerant passes through four-way valve 2, indoor heat exchanger 5, expansion valve 4, outdoor heat exchanger 3 and four-way valve 2 and returns to compressor 1. In this mode, outdoor heat exchanger 3 functions as evaporator while indoor heat exchanger 5 functions as condenser. Therefore, the inside of the room is heated.

During operation, various controls are carried out according to stored outside air temperature To1 (step S111). For example, when stored outside air temperature To1 is higher than a specific value, current release control reduces the output frequency of inverter circuit 41 in order to avoid an abnormal temperature rise in inverter circuit 41. Outside air temperature To1 is also used to correct set temperature Ts in order to improve the comfort inside the room.

At step S112, it is determined whether operation start/end switch 72 on the remote controller 70 has been pushed and the operation end signal from signal transmitting circuit 76 has been input to indoor control circuit 20. If the operation end signal has been received, the air conditioner is stopped in accordance with steps S122 to S124. In step S122, compressor 1, outdoor fan 6 and indoor fan 7 are stopped. Stored outside air temperature To1 is held (step S123). Then, timer (tb) begins counting the time period after the air conditioner is stopped (step S124), and the operation flow returns to step S101.

If the operation end signal has not been received, operation flow goes to step S130 in FIG. 8(b). In step S130, it is determined whether inverter frequency F is equal to 0 (Hz). If the inverter frequency is 0, that is the room is at the desired temperature, called therm-off state, inquiry is made whether a timer (tc) is counting (step S131). Timer (tc) counts the period of the therm-off state in order to store an accurate outdoor air temperature in the memory. The first time step S131 is reached, timer (tc) is not counting. Thus, the inquiry in step S131 is No, and timer (tc) is started (step S135). If timer (tc) has already been started, it is determined whether the count of timer (tc) is larger than 10 minutes (step S132). If so, that is the therm-off state has been longer than 10 minutes, timer (ta) is reset (step S133). Also, outdoor heat exchanger temperature Te is detected and read in, and the detected outdoor heat exchanger temperature Te is stored as outside air temperature To1 in the memory at predetermined intervals, for example 10 minutes intervals (step S134). That is, 10 minutes after compressor 1 is stopped, or is in the therm-off state, the influence of the refrigerant passing through outdoor heat exchanger diminishes. Therefore, outdoor heat exchanger temperature Te is nearly equal to an actual outside air temperature To, so previously stored outside air temperature To1 is changed to detected outdoor heat exchanger temperature Te which may be closer to the actual outside air temperature To than the previously stored outside air temperature To1. After steps S134, S135 and if time tc is not larger than 10 minutes, the operation flow returns to room temperature detecting step S108.

If inverter frequency F is not 0 in step S130, timer (tc) is reset, namely time tc becomes 0, because the air conditioner is not in a therm-off state (step S140). Then inquiry is made whether timer (ta) is counting (step S141). If timer (ta) is not counting, timer (ta) starts to count, then operation flow returns to step S108. If inverter frequency F has never been 0 after operation starts, timer (ta) has already started in step S107. Also, timer (ta) is detected as counting in step S141 after inverter frequency F increases from 0. If timer (ta) is counting in step S141, inquiry is made whether time ta counted by timer (ta) is greater than or equal to specific time t1 for example 5 minutes (step S143). If time ta has reached the specific time t1, outdoor heat exchanger temperature Te is detected and read-in (step S144). Then, the table corresponding to the cooling or heating operation mode and the speed of variable speed outdoor fan 6 is selected (step S145). When the tap of the variable speed outdoor fan motor 6M is "H" or "M" during the cooling mode, the table shown in FIG. 4 is selected. When the tap of the variable speed outdoor fan motor 6M is "L" during the cooling mode, the table shown in FIG. 5 is selected. Furthermore, when the tap of the variable speed outdoor fan motor 6M is "M" or "L" during the heating mode, the table shown in FIG. 6 is selected. Finally, when the tap of the variable speed outdoor fan motor 6M is "H" during the heating mode, the table shown in FIG. 7 is selected. After the table selecting, outdoor heat exchanger temperature Te detected in step S144 and inverter frequency F are applied to the selected table, and correction value Cv for outside air temperature estimation is read from the selected table (step S146). Correction value Cv is a function of outdoor heat exchanger temperature Te and inverter frequency F. For example, when the speed of the outdoor fan is "H" in the cooling mode, the table shown in FIG. 4 is selected. And when outdoor heat exchanger temperature Te is 30° C. and inverter frequency F is 25 Hz, correction value Cv=−5.5 is selected. As another example, suppose the speed of outdoor fan is "L" in the heating mode. Then the table shown in FIG. 6 is selected. When outdoor heat exchanger temperature Te is 20° C. and inverter frequency F is 50 Hz, correction value Cv=5.5 is selected.

Once correction value Cv is determined, estimated outside air temperature To2 is calculated from the following equation using correction value Cv and outdoor heat exchanger temperature Te (step S147):

$$To2 = Te + Cv$$

After the calculation, the estimated outside air temperature To2 in step S147 is stored in the memory as outside air temperature To1. Then, the operation flow returns to step S108. Therefore, the above mentioned controls using outside air temperature To1, for example, current release control and set temperature correction control, are executed based on the newly stored outside air temperature To1, that is estimated outside air temperature To2 in step S147.

Figure 9:
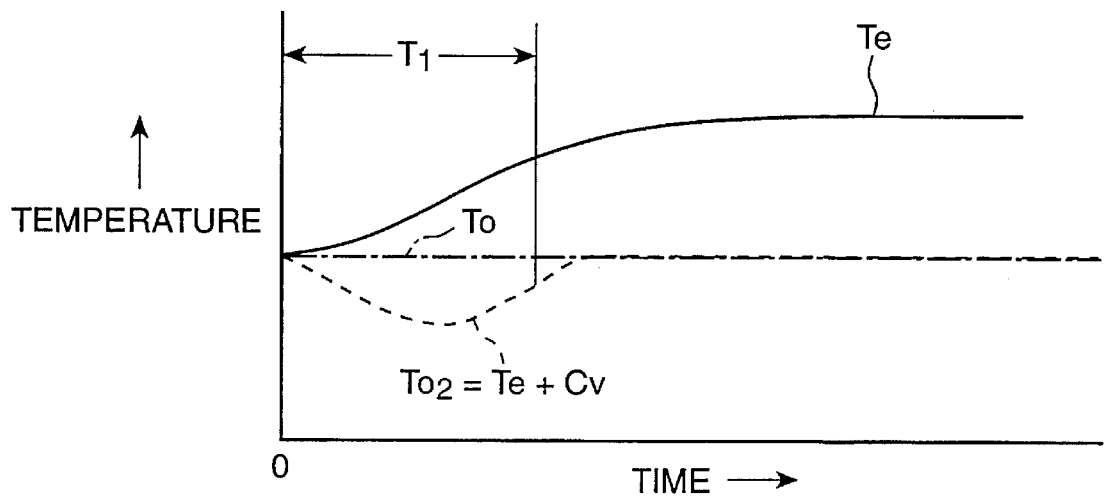
Figure 10:
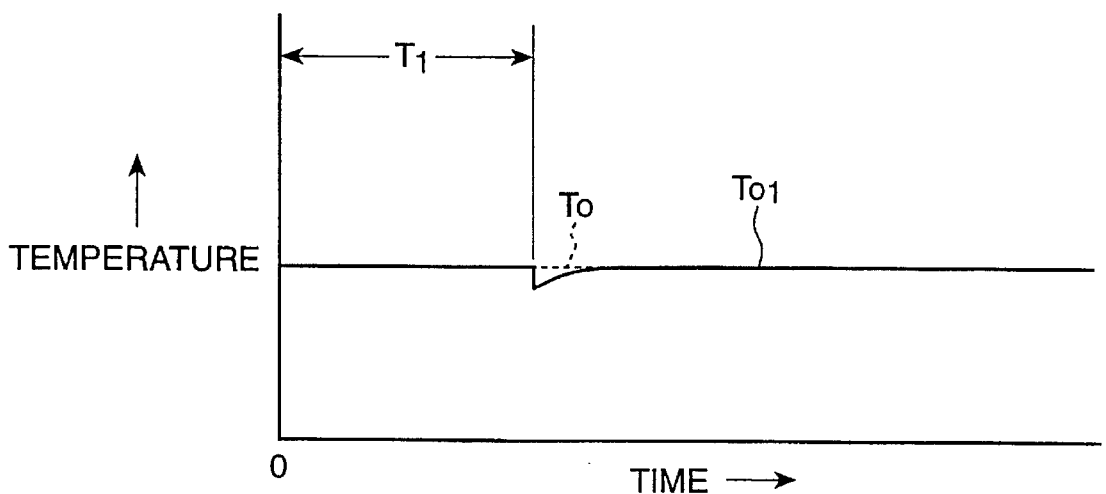

FIG. 9 shows the relationship between outdoor heat exchanger temperature Te and estimated outside air temperature To2. Since operation on starting up is unstable, the proportional relationship as shown in FIG. 3 is not established, and estimated outside air temperature To2 is significantly offset from the actual outside air temperature To. However, the cooling or heating operation becomes stabilized a certain time after start-up. Thereafter, a proportional relationship is established. Namely, after a specific time period t1 has passed after start-up, estimated outside air temperature To2 approaches the actual outside air temperature To as shown in FIG. 9. Therefore, for the specific time t1 (about 5 minutes) from the operation start, estimated outside air temperature To2 is not used. Instead, previously stored outside air temperature To1 is used as an outside air temperature in the control for time period t1. See FIG. 10. This time period after start-up is counted by timer (ta).

Figure 11A:
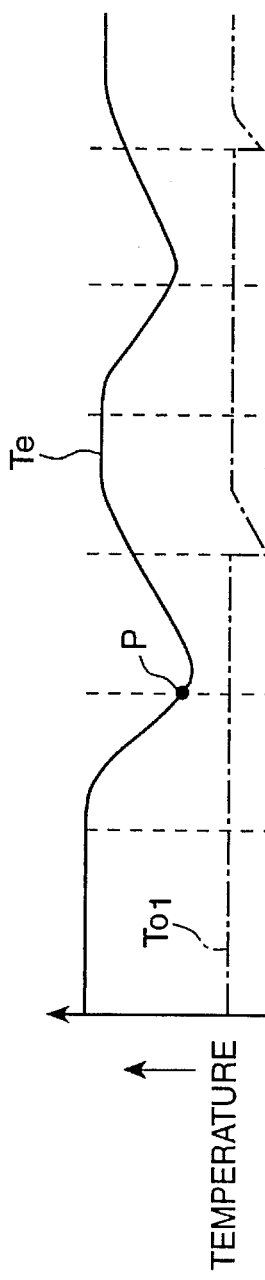
FIGS. 11(a) to 11(c) are time charts showing the relationship between a stored outside air temperature To1, the actual outside temperature To and the air conditioner and compressor operation.
Figure 11B:
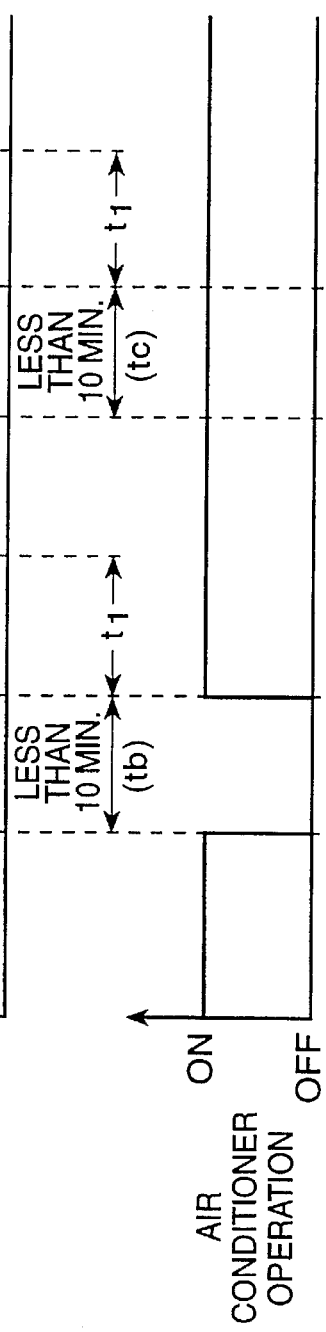
Figure 11C:
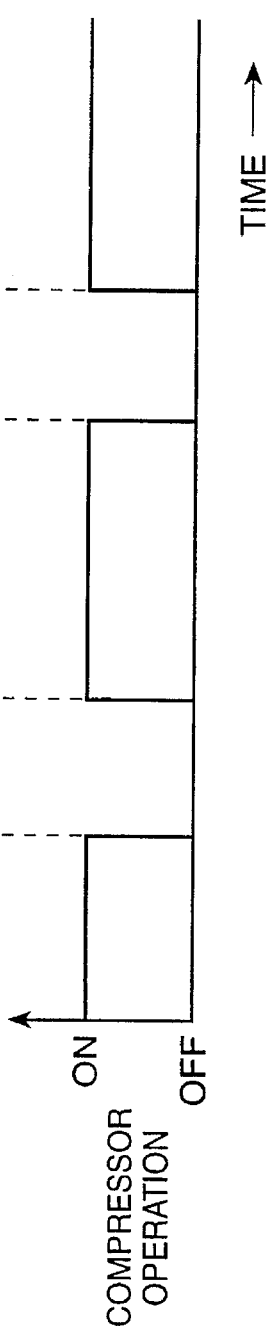

The stored outside temperature To1 used in the air conditioner control in step S111 at the start-up operation is determined based on the time period from the end of the previous operation. If time tb counted by timer (tb), which shows the time period from the end of the previous operation, is more than 10 minutes at the time the next operation is started, stored outside temperature To1 is set to be outside heat exchanger temperature Te (step S105). If time tb is not more than 10 minutes (see FIG. 11(b)), the previously stored outside air temperature To1 from the previous operation is used as the outside air temperature. Thus, when re-starting operation soon after the end of the previous operation, there is a difference between the outdoor heat exchanger temperature Te and the actual outside air temperature To, because cooled or heated refrigerant has recently passed through the heat exchanger during the previous operation (point P shown in FIG. 11(a)). For this reason, it is not desirable to use outdoor heat exchanger temperature Te as outside air temperature To1. Therefore, when operation restarts before 10 minutes have elapsed from the end of the previous operation, stored outside air temperature To1 used at the end of the previous operation is used as the outside air temperature. Outside air temperature To1 found in this way becomes a stable value almost equal to the actual outside air temperature, as shown in FIG. 11(a). Furthermore, outside air temperature To1, after the therm-off state, is decided by the same manner. If, at the time the compressor is restarted, the time period that the compressor had been stopped, which is counted by timer (tc), is less than 10 minutes (see FIG.

11(c)), there is a difference between outdoor heat exchanger temperature Te and actual outside air temperature To. Therefore, previously stored outside air temperature To1 is used as the outside air temperature for controlling the air conditioner. If time tc is more than 10 minutes, the influence of refrigerant passing through the outdoor heat exchanger in the previous operation has diminished. Therefore, outdoor heat exchanger temperature Te is nearly equal to an actual outside air temperature To. Therefore, previously stored outside air temperature To1 is changed to be the same as detected outdoor heat exchanger temperature Te, and this outdoor heat exchanger temperature Te is used as outside air temperature To1 in the air conditioner operation. The outside air temperature To1 is updated at predetermined intervals during the therm-off state. Therefore, outside air temperature To1 used in the air conditioner control is accurate, even if the therm-off state continues for a long time.

In the above embodiment, four tables are employed. However, it is also possible to use a suitable number of tables according to the compressor capacity and the speed of the outdoor fan. Furthermore, the above embodiment uses tables pre-storing the correction value designating the relationship between inverter frequency F and outdoor heat exchanger temperature Te. However, it is also possible to calculate the estimated outside air temperature To2 on basis of functions stored in the memory which designates the relationship between inverter frequency F and outdoor heat exchanger temperature Te.

Also, a configuration which varies the speed of the outdoor fan 6 by tap select has been described. However, the speed may also be varied by using conductive phase control for outdoor fan motor 6M (AC motor), or by using a DC motor as the outdoor fan motor 6M, providing an inverter circuit for driving the DC motor and controlling the output frequency of the inverter circuit.

Many changes and modifications in the above described embodiment can be carried out without departing from the scope of general inventive concept as defined by the appended claims and their equivalents.

What is claimed is:

1. Air conditioner apparatus comprising:
   a refrigerating circuit including a variable capacity compressor, an indoor heat exchanger, an expansion device, and an outdoor heat exchanger;
   a variable speed outdoor fan for circulating outside air through the outdoor heat exchanger;
   means for detecting the temperature of the outdoor heat exchanger;
   means for estimating an outside air temperature from the detected outdoor heat exchanger temperature, the capacity of the variable capacity compressor and the speed of the variable speed outdoor fan; and
   means for controlling at least one of the fan and variable capacity compressor in response to the estimated outside air temperature.

2. Air conditioning apparatus according to claim 1, wherein the variable capacity compressor comprises:
   a compressor for compressing a refrigerant in the refrigerating circuit;
   a motor for driving the compressor; and
   an inverter for supplying variable frequency power to the motor so as to change the speed of the compressor.

3. Air conditioning apparatus according to claim 2, wherein the capacity of variable capacity compressor is controlled by controlling the frequency of the inverter.

4. Air conditioning apparatus according to claim 1, wherein the estimating means estimates the outside air temperature by correcting the detected outdoor heat exchanger temperature in accordance with the capacity of the variable capacity compressor and the speed of the variable speed outdoor fan.

5. Air conditioning apparatus according to claim 1, wherein the estimating means comprises:
   a memory for storing a plurality of tables corresponding to the speed of the variable speed outdoor fan, each table storing correction temperature data for outside air temperature estimation, based on the detected outdoor heat exchanger temperature and the capacity of the variable capacity compressor;
   means for selecting one of the tables based on the speed of the variable speed outdoor fan;
   means for selecting the correction temperature data based on the detected outdoor heat exchanger temperature and the capacity of the variable capacity compressor; and
   means for calculating the outside air temperature from the correction temperature data and the detected outdoor heat exchanger temperature.

6. Air conditioning apparatus comprising:
   a refrigerating circuit including a variable capacity compressor, a four way valve, an indoor heat exchanger, an expansion device, and an outdoor heat exchanger comprising:
   means for selecting either a heating or cooling operation mode and changing a flow direction of a refrigerant in the refrigerating circuit by operating the four way valve in response to the selected operation mode;
   a variable speed outdoor fan for circulating outside air through the outdoor heat exchanger;
   means for detecting the temperature of outdoor heat exchanger; and
   means for estimating an outside air temperature from the detected outdoor heat exchanger temperature, the capacity of the variable capacity compressor and the speed of the variable speed outdoor fan, the estimating means comprising:
      a memory for storing a plurality of tables corresponding to the speed of the variable speed outdoor fan and the selected operation mode, each table storing correction temperature data for outside air temperature estimation, based on the detected outdoor heat exchanger temperature and the capacity of the variable capacity compressor,
      means for selecting one of the tables based on the speed of the variable speed outdoor fan and the selected operation mode,
      means for selecting the correction temperature data based on the detected outdoor heat exchanger temperature and the capacity of the variable capacity compressor, and
      means for calculating the outside air temperature from the correction temperature data and the detected outdoor heat exchanger temperature; and
   means for controlling at least one of the fans and variable capacity compressor in response to the estimated outside air temperature.

7. Air conditioning apparatus according to claim 1 or 6, further comprising:
   operation start estimated outside air temperature determining means for selecting at the time the air conditioning apparatus is started: 1) the outdoor heat exchanger temperature detected by the outdoor heat exchanger temperature detecting means as the estimated outside air temperature when the time period after the end of a previous operation of the air conditioning apparatus is not less than a predetermined time, and 2) the estimated outside air temperature at an end of the previous operation of the air conditioning apparatus as the estimated outside air temperature when the time period after the end of the previous operation of the air conditioning apparatus is less than the predetermined time.

8. Air conditioning apparatus according to claim 7, further comprising:

after operation start estimated outside air temperature determining means for determining the estimated outside temperature with the operation start estimated outside air temperature determining means during a predetermined time after the start of the air conditioning apparatus.

9. Air conditioning apparatus according to claim 7, further comprising:

operation start/end means for controlling the operation start and end of the air conditioning apparatus.

10. Air conditioning apparatus according to claim 9, wherein the operation start/end means includes a manually operable operation start/end switch for inputting operation start and end commands for the air conditioning apparatus.

11. Air conditioning apparatus according to claim 1 or 6, further comprising:

compressor start estimated outside air temperature determining means for selecting for a first predetermined time after a start of the variable capacity compressor: 1) the outdoor heat exchanger temperature detected by the outdoor heat exchanger temperature detecting means previous as the estimated outside air temperature when a time period after the previous stop of the compressor is less than a second predetermined time, and 2) the estimated outside temperature at the previous stopping of the compressor as the estimated outside air temperature when the time period after the previous stopping of the compressor is not less than a second predetermined time.

12. Air conditioning apparatus according to claim 11, further comprising:

an inside temperature sensor for detecting an inside temperature of a space to be conditioned; and temperature setting means for setting a desired temperature of the space, wherein said controlling means controls the starting and stopping of the compressor in accordance with the difference between the inside temperature and the desired temperature.

13. Air conditioning according to claim 11, further comprising:

after compressor start estimated outside air temperature determining means for determining the estimated outside temperature with the compressor start estimated outside temperature determining means during a predetermined time after the compressor starts.

14. Apparatus for estimating outside temperature in an air conditioner having a refrigerating circuit including a variable capacity compressor, an indoor heat exchanger, an expansion device, an outdoor heat exchanger and a variable speed outdoor fan for circulating outside air through the outdoor heat exchanger, the apparatus comprising:

means for detecting the temperature of the outdoor heat exchanger; and means for estimating an outside air temperature from the detected outdoor heat exchanger temperature, the capacity of the variable capacity compressor and the speed of the variable speed outdoor fan.

15. Apparatus according to claim 14, wherein the estimating means estimates the outside air temperature by correcting the detected outdoor heat exchanger temperature in accordance with the capacity of the variable capacity compressor and the speed of the variable speed outdoor fan.

16. Apparatus according to claim 14, wherein the estimating means comprises:

a memory for storing a plurality of tables corresponding to the speed of the variable speed outdoor fan, each table storing correction temperature data for outside air temperature estimation, based on the detected outdoor heat exchanger temperature and the capacity of the variable capacity compressor;

means for selecting one of the tables based on the speed of the variable speed outdoor fan;

means for selecting the correction temperature data based on the detected outdoor heat exchanger temperature and the capacity of the variable capacity compressor; and means for calculating the outside air temperature from the correction temperature data and the detected outdoor heat exchanger temperature.

17. Apparatus according to claim 14, further comprising:

operation start estimated outside air temperature determining means for selecting at the time the air conditioning apparatus is started: 1) the outdoor heat exchanger temperature detected by the outdoor heat exchanger temperature detecting means as the estimated outside air temperature when the time period after the end of a previous operation of the air conditioning apparatus is not less than a predetermined time, and 2) the estimated outside air temperature at an end of the previous operation of the air conditioning apparatus as the estimated outside air temperature when the time period after the end of the previous operation of the air conditioning apparatus is less than the predetermined time.

18. Apparatus according to claim 17, further comprising:

after operation start estimated outside air temperature determining means for determining the estimated outside temperature with the operation start estimated outside air temperature determining means temperature during a predetermined time after the start of the air conditioning apparatus.

19. A method for controlling an air conditioner having a refrigerating circuit including a variable capacity compressor, an indoor heat exchanger, an expansion device, and an outdoor heat exchanger, and a variable speed outdoor fan for circulating outside air through the outdoor heat exchanger comprising the steps of:

detecting the temperature of the outdoor heat exchanger;

estimating an outside air temperature from the detected outdoor heat exchanger temperature, the capacity of the variable capacity compressor and the speed of the variable speed outdoor fan; and controlling at least one of the fan and the variable capacity compressor in response to the estimated outside air temperature.

20. A method for controlling an air conditioner according claim 19, further including the step of:

selecting at the time the operation of the air conditioner is started: 1) the detected outdoor heat exchanger temperature as the estimated outside air temperature when the time period after the end of a previous operation of the air conditioner is not less than a predetermined time, and 2) the estimated outside air temperature at an end of the previous operation of the air conditioner as the estimated outside air temperature when the time period after the end of the previous operation of the air conditioner is less than the predetermined time.

21. A method for controlling an air conditioner according to claim 20, further comprising the step of:

determining the estimated outside temperature in accordance with the operation start selecting step during a predetermined time after the start of the air conditioner.

22. A method for controlling an air conditioner according to claim 19, wherein the estimating step estimates the outside air temperature by correcting the detected outdoor heat exchanger temperature in accordance with the capacity of the variable capacity compressor and the speed of the variable speed outdoor fan.

23. A method for controlling an air conditioner according to claim 19, wherein the estimating step comprises:

storing a plurality of tables corresponding to the speed of the variable speed outdoor fan, each table storing correction temperature data for outside air temperature estimation, based on the detected outdoor heat exchanger temperature and the capacity of the variable capacity compressor;

selecting one of the tables based on the speed of the variable speed outdoor fan;

selecting the correction temperature data based on the detected outdoor heat exchanger temperature and the capacity of the variable capacity compressor; and calculating the outside air temperature from the correction temperature data and the detected outdoor heat exchanger temperature.

24. A method for controlling an air conditioner according to claim 19, further comprising:

selecting for a first predetermined time after a start of the variable capacity compressor: 1) the outdoor heat exchanger temperature detected by the outdoor heat exchanger temperature detecting step previous as the estimated outside air temperature when a time period after the previous stop of the compressor is less than a second predetermined time, and 2) the estimated outside temperature at the previous stopping of the compressor as the estimated outside air temperature when the time period after the previous stopping of the compressor is not less than a second predetermined time.

\* \* \* \* \*